United States Patent
Araujo et al.

(10) Patent No.: US 10,908,691 B2
(45) Date of Patent: Feb. 2, 2021

(54) PERCEPTION OF HAPTIC OBJECTS

(71) Applicant: Telefonaktiebolaget LM Ericsson (publ), Stockholm (SE)

(72) Inventors: Jose Araujo, Stockholm (SE); Harald Gustafsson, Lund (SE); Per Persson, Sodra Sandby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/625,894

(22) PCT Filed: Jul. 27, 2017

(86) PCT No.: PCT/EP2017/068975
§ 371 (c)(1),
(2) Date: Dec. 23, 2019

(87) PCT Pub. No.: WO2019/020184
PCT Pub. Date: Jan. 31, 2019

(65) Prior Publication Data
US 2020/0150769 A1    May 14, 2020

(51) Int. Cl.
*G06F 3/01* (2006.01)
(52) U.S. Cl.
CPC .................... *G06F 3/016* (2013.01)
(58) Field of Classification Search
CPC ..................................... G06F 3/016
See application file for complete search history.

(56) References Cited

U.S. PATENT DOCUMENTS

| 8,207,832 B2 | 6/2012 | Yun et al. |
| 9,177,452 B1 | 11/2015 | Mosterman et al. |
| 10,656,759 B1 * | 5/2020 | Smith ................. G06F 3/04817 |

(Continued)

FOREIGN PATENT DOCUMENTS

| EP | 2821912 A1 | 1/2015 |
| EP | 2849032 A1 | 3/2015 |

(Continued)

OTHER PUBLICATIONS

PCT International Search Report, dated Dec. 13, 2017, in connection with International Application No. PCT/EP2017/068975, all pages.

(Continued)

*Primary Examiner* — Dmitriy Bolotin
(74) *Attorney, Agent, or Firm* — Leffler Intellectual Property Law, PLLC

(57) ABSTRACT

A method for use in a haptic device, comprising a first haptic presentation device, said method comprising: receiving a haptic model comprising one or more haptic objects being associated with haptic properties; determining at least one location property of at least a first and a second of the one or more haptic objects, wherein the location property is related to a location of the corresponding haptic object; determining a relation between haptic properties of the first and second haptic objects; and adapting at least one haptic property of one or both of the first and second haptic objects, based on the at least one location property and the determined relation between the haptic properties of the first and second haptic objects.

10 Claims, 4 Drawing Sheets

(56) References Cited

U.S. PATENT DOCUMENTS

| | | | | |
|---|---|---|---|---|
| 2007/0247393 | A1* | 10/2007 | Kuroki | G06T 1/00 345/8 |
| 2009/0085878 | A1 | 4/2009 | Heubel et al. | |
| 2009/0322498 | A1* | 12/2009 | Yun | G06F 3/0488 340/407.2 |
| 2017/0344116 | A1* | 11/2017 | You | G06F 3/016 |

FOREIGN PATENT DOCUMENTS

| | | |
|---|---|---|
| EP | 2933709 A2 | 10/2015 |
| WO | 2010105012 A1 | 9/2010 |

OTHER PUBLICATIONS

PCT Written Opinion, dated Dec. 13, 2017, in connection with International Application No. PCT/EP2017/068975, all pages.

E. Dorjgotov et al., "Portable Haptic Display for Large Immersive Virtual Environments", Symposium on Haptic Interfaces for Virtual Environment and Teleoperator Systems, Mar. 25-26, 2006, Alexandria, VA, USA, pp. 321-327.

M. Kerttula et al., "Virtual Reality Prototyping—a Framework for the Development of Electronics and Telecommunication Products", Rapid System Prototyping, Shortening the Path from Specification to Prototype Proceedings, 8th IEEE International Workshop on Chapel Hill, NC, USA, Jun. 24-26, 1997, pp. 2-11.

J. Gaudiosi et al., "Virtual Touch: Inside Technology That Makes VR Feel Real", Rolling Stone, Sep. 13, 2016, http://www.rollingstone.com/culture/features/virtual-touch-inside-technology-that-makes-vr-feel-real-w438867, 18 pages.

Unknown, "Haptic technology: The next frontier in video games, wearables, virtual reality, and mobile electronics", New Atlas, Jan. 15, 2015, 1. http://www.gizmag.com/haptic-tech-vr-wearables-games-sightlence/35616/, 14 pages.

* cited by examiner

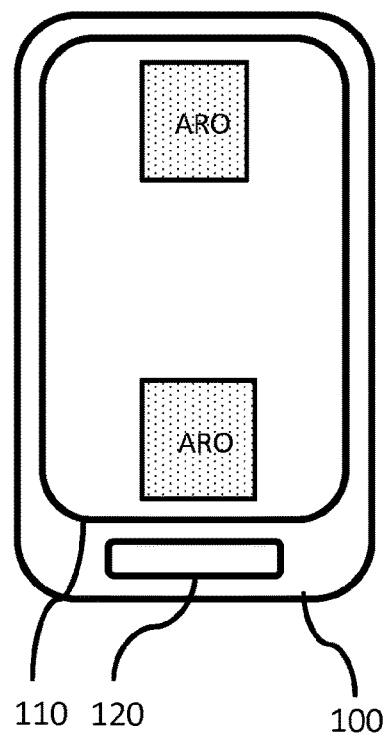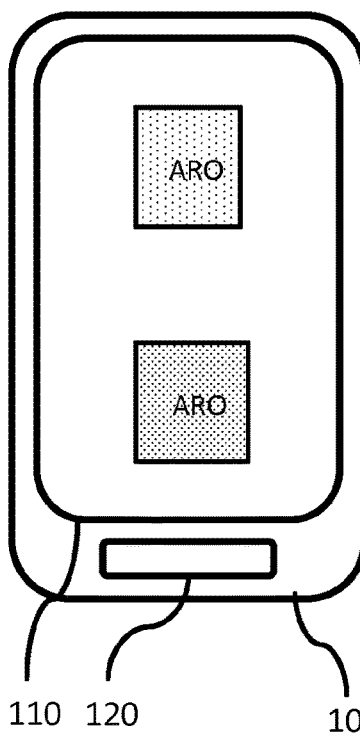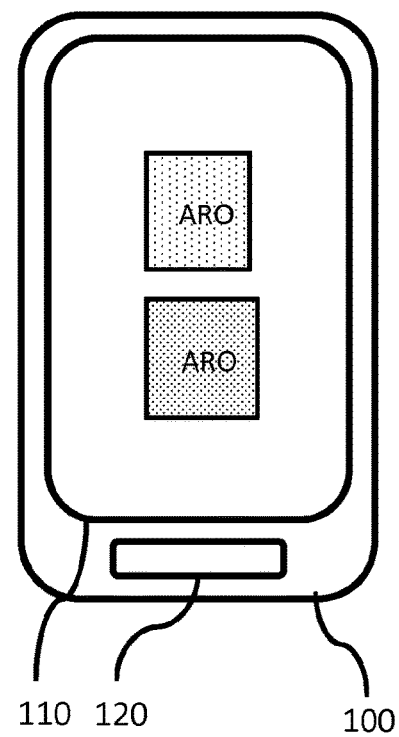
FIG. 3A  FIG. 3B  FIG. 3C
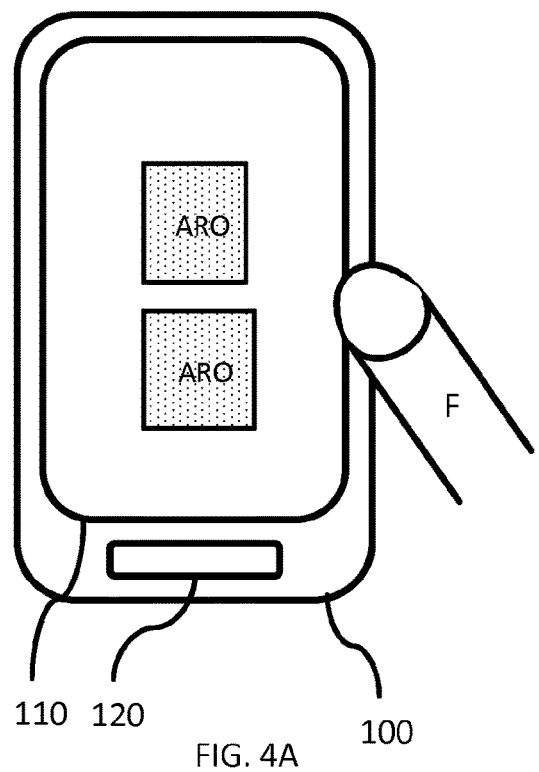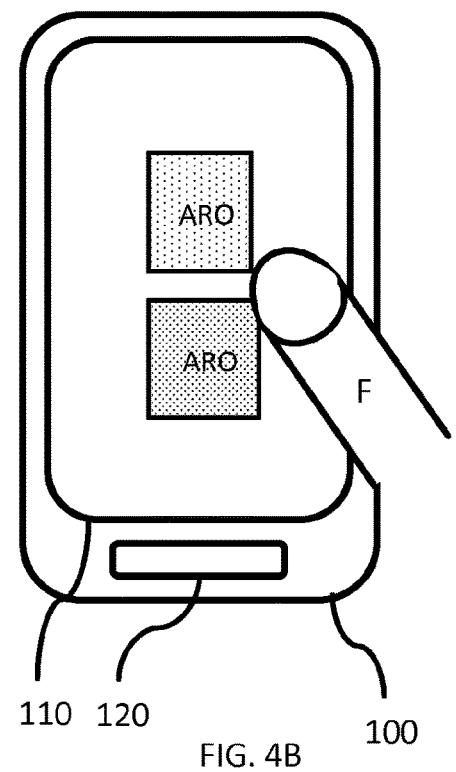
FIG. 4A  FIG. 4B

PERCEPTION OF HAPTIC OBJECTS

TECHNICAL FIELD

This application relates to a haptic device, a method and a computer-readable storage medium for improved perception of haptic objects.

BACKGROUND

Haptic, such as tactile or kinaesthetic, communication recreates the sense of touch by applying forces, vibrations, or motions to the user, which is commonly known as the tactile internet or haptic internet. This physical stimulation can be used to assist in the creation of virtual objects in a computer simulation, to control such virtual objects, and to enhance the remote control of machines and devices. Haptic devices may incorporate haptic sensors that measure forces exerted by the user on a user interface such as a haptic display. There are two sensory systems related to sense of touch in humans: kinaesthetic and tactile/cutaneous. For the purpose of this application they will all be referred to as being haptic and will be associated with active touch to communicate or recognize objects.

The haptic/tactile internet is seen as the next step in mobile networking. Users are currently able to efficiently communicate over voice and video, but in the future networked society it is envisioned that people will be able to communicate the sense of touch via haptic presentation devices. In the past years, there has been a large amount of research on devices which allow such communication to take place. Several new haptic devices are being developed, particularly ones that are able to be worn by the user such as gloves, vests, but also integrated in smartphones and smartwatches. New low cost mobile haptic presentation devices, are currently being developed by several companies such as Microsoft (NormalTouch and Texture Touch), Neurodigital (GloveOne), Tactai (Tactai Touch) for augmented reality and virtual reality applications. Various haptic actuator technologies are also being used such as ultrasound (e.g. Ultrahaptics), vibrotactile (e.g. Apple's Macbook), electrostatic, piezoelectric (e.g. TPad smartphone) and mechanical (e.g., MIT's Inform 3D displays).

With the advent of the 5G (fifth generation) telecommunications systems, it is envisioned that many telecommunication devices will be provided with haptic input and/or output means, such as haptic displays.

As is known, many different kind of haptic devices, such as haptic telecommunication devices exist today, such as smartphones, internet tablets, gaming devices, and (laptop) computers to mention a few, and also gaming devices, haptic gloves, glasses or other head mounted devices.

Several solutions for haptic devices consider the interaction with a user interface (buttons, sliders, etc.) or they provide haptic feedback with respect to the image which is being displayed in the device's touchscreen. In other use cases, two users using a haptic presentation device may transmit the sense of touch to each other by interacting with the display in real-time. Each user receives haptic feedback with respect to the haptic properties (e.g. texture, friction, stiffness) of the user interface, image, object or the other user's finger on a specific location since the device is capable of tracking the user's finger position. The TPad smartphone is the first haptic smartphone and has been commercialized by a US startup since 2015. The phone is built upon a Motorola android phone with a piezoelectric actuated screen on top of it, which is able to generate various friction and texture effects via vibration.

In view of the problems and shortcomings indicated above, there is a need for an improved manner of transmitting haptic data from one haptic telecommunications device to another haptic telecommunications device having different haptic output properties.

SUMMARY

The inventors of the present invention have realized, after inventive and insightful reasoning that there are envisioned problems haptic presentation devices are being developed to handle more and more objects as discussed above and below.

This invention proposes a manner to adapt the haptic properties of two haptic objects to render them being discernible.

It is therefore an object of the teachings of this application to overcome or at least mitigate one or more of the problems and shortcomings listed above and below by providing a method for use in a haptic device, comprising a first haptic presentation device, said method comprising: receiving a haptic model comprising one or more haptic objects being associated with haptic properties; determining at least one location property of at least a first and a second of the one or more haptic objects, wherein the location property is related to a location of the corresponding haptic object; determining a relation between haptic properties of the first and second haptic objects; and adapting at least one haptic property of one or both of the first and second haptic objects, based on the at least one location property and the determined relation between the haptic properties of the first and second haptic objects.

In one embodiment, the method further comprises determining at least one location property of at least a first and a second of the one or more haptic objects, wherein the location property is related to a location of the corresponding haptic object by determining if two or more haptic objects are proximate to one another; determining a relation between haptic properties of the first and second haptic objects by evaluating the similarities of the haptic properties of the haptic objects, and determining that two or more objects are similar and proximate one another; and adapting at least one haptic property of one or both of the first and second haptic objects, based on the at least one location property and the determined relation between the haptic properties of the first and second haptic objects by adapting the haptic properties of one or more of the similar and proximate objects. It is also an object of the teachings of this application to overcome or at least mitigate one or more of the problems and shortcomings listed above and below by providing a haptic device, comprising a first haptic presentation device, said haptic device being configured to: receive a haptic model comprising one or more haptic objects being associated with haptic properties; determine at least one location property of at least a first and a second of the one or more haptic objects, wherein the location property is related to a location of the corresponding haptic object; determine a relation between haptic properties of the first and second haptic objects; and adapt at least one haptic property of one or both of the first and second haptic objects, based on the at least one location property and the determined relation between the haptic properties of the first and second haptic objects.

It is also an object of the teachings of this application to overcome or at least mitigate one or more of the problems and shortcomings listed above and below by providing a computer readable storage medium encoded with instructions that, when executed on a processor, perform a method according to herein.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings, in which:

FIG. 3A shows a schematic view of an example haptic device system according to one embodiment of the teachings of this application;

FIG. 3B shows a schematic view of an example haptic device system according to one embodiment of the teachings of this application;

FIG. 3C shows a schematic view of an example haptic device system according to one embodiment of the teachings of this application;

FIG. 4A shows a schematic view of an example haptic device system according to one embodiment of the teachings of this application;

FIG. 4B shows a schematic view of an example haptic device system according to one embodiment of the teachings of this application;

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1A:
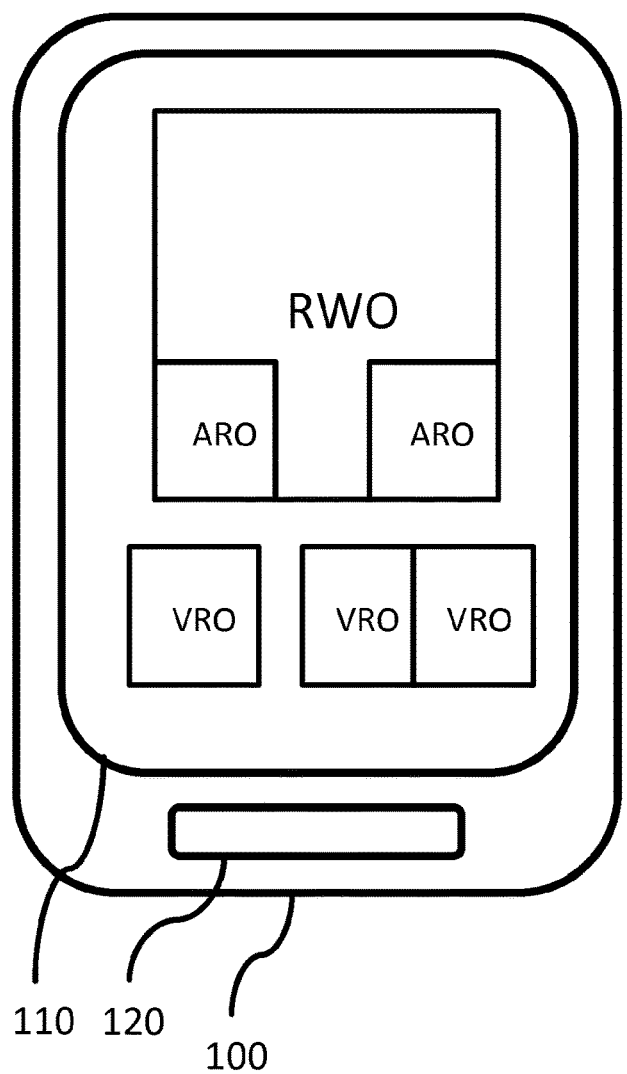
FIG. 1A shows a schematic overview of a haptic device according to one embodiment of the teachings of this application.

FIG. 1A shows a schematic overview of haptic device 100 according to one embodiment of the present invention. The haptic device may be a robotic tool, a smartwatch, a smartphone, an internet tablet, a (laptop) computer, a gaming device, a haptic glove, glasses or other head mounted devices. In the following the haptic device will be exemplified as being a smartphone 100.

The haptic device 100 comprises a haptic presentation device 110 being able to output and/or receive haptic data. On example of such a haptic presentation device is a haptic display 110. Another example of a haptic presentation device is an arrangement where a display presents real world data (such as images or video) as well as possibly augmented and/or virtual reality data (such as icons or virtual/augmented objects). For the purpose of this application, no difference will be made between augmented reality objects and virtual reality objects and they will be treated as the same, namely as examples of logical or haptic objects. On example of such an arrangement is a head mounted device, such as virtual glasses, operating in parallel with haptic gloves, the glasses providing the visual presentation, and the gloves providing the haptic presentation.

Returning to the example of the haptic device being a haptic display 110, it may be a touch display where a portion is arranged for receiving input of haptic data and for outputting haptic data. For the purpose of this application, the haptic display 110 of such an embodiment, will be regarded as the portion of a touch display that is arranged for portion is arranged for receiving input of haptic data and for outputting haptic data, and thus also be a part of a user interface of the haptic device 100. The portion that is arranged for haptic presentation may take up the whole display area. It may also be larger than the display area.

The haptic display 110 is used as a touch sensitive display where a user perceives haptic objects by touching their haptic presentation as it is presented. The haptic presentation may relate to a pressure, a texture, stiffness, friction or roughness.

In FIG. 1A the display 110 is configured to present or display one or more haptic or logical objects (a haptic object being a logical object associated with haptic properties). The objects may be real world objects (RWO) which are commonly visual objects identified in an image or a video stream. The objects may be augmented reality or virtual reality objects (ARO, VRO) which are commonly augmented reality or virtual reality objects overlaid in a real world view or virtual world for providing data or control options.

Figure 1B:
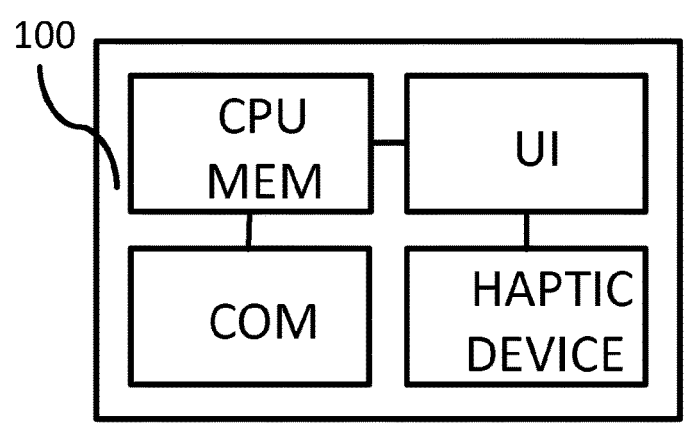
FIG. 1B shows a schematic overview of the components of a haptic device according to one embodiment of the teachings of this application.

The haptic device 100 may also comprise other input means such as one or several buttons or keys 120, being virtual and/or physical, perhaps part of a traditional touch display. As a skilled person would understand, many options exist and this application will not go into detail about all possible combinations, but only give an example of one button 120, but it should be understood that many variations exist and are all considered to be represented by the button 120. FIG. 1B shows a schematic view of the components of a haptic device 100. A controller CPU is configured to control the overall and also specific functions of the haptic device 100 such as by executing computer program instructions loaded into or stored on a memory connected or being part of the controller. The controller may comprise one or more processors or other logic programmable circuits for combined or individual execution of a task or application.

However, for the purpose of this application they will be seen as being the one and same controller CPU.

The controller CPU is connected to a memory MEM for storing computer instructions and also data to be processed by the computer instructions when executed by the controller CPU. The memory may comprise one or several memory circuits, possibly arranged in a hierarchy. One or more of such memory circuits may be comprised in the controller CPU. For the purpose of this application the memory circuits will be regarded as one memory MEM.

The controller CPU is also connected to a user interface UI for receiving input from a user and for presenting data or other information to the user. As discussed above, a haptic presenter, such as a haptic display, is comprised in the user interface UI.

The controller is also connected to a communications interface COM, such as a Radio frequency interface. The RF interface may be configured to operate according to a long range standard, such as a cellular network standard, for example a 5G standard. The RF interface may alternatively or additionally be configured to operate according to a short range standard, such as a Bluetooth®, IEEE802.11b (WiFi™), IEEEE802.16, ZigBee™ or NFC™ (Near Field Communication) standard, for example a 5G standard.

The communications interface COM enables a first haptic device 100 to communicate with a second haptic device (referenced 100A and 100B in FIG. 2 and as will be discussed in greater detail with reference to FIG. 2) for receiving and/or transmitting visual and haptic data. The communications interface COM may also enable a haptic device 100 to communicate with a server for receiving haptic information on various objects.

Figure 2A:
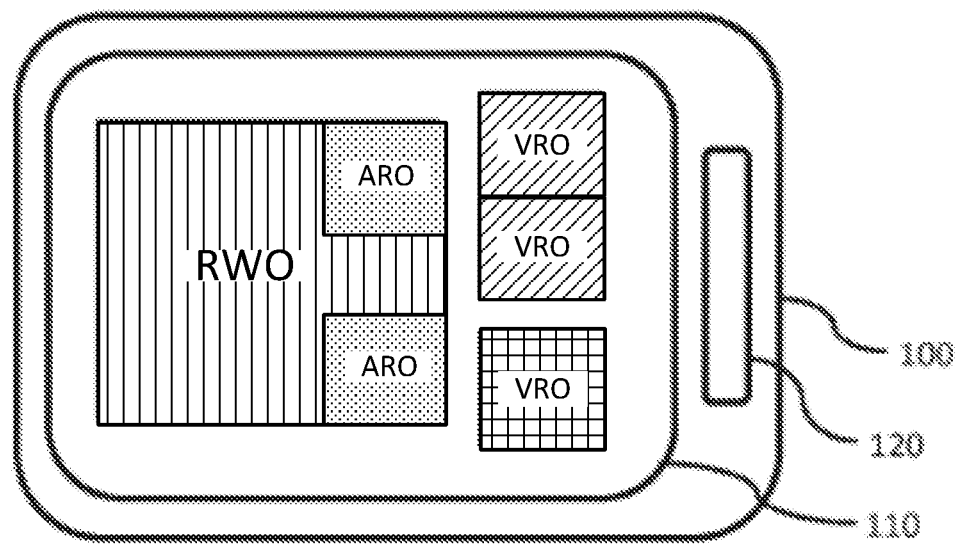
FIG. 2A shows a schematic view of an example haptic device system according to one embodiment of the teachings of this application experiencing envisioned problems according to an aspect of the teachings of this application.

FIG. 2A shows a communication system in which a haptic device 100 presenting one real world object (RWO) that is overlaid by two augmented reality objects (ARO) and a lone virtual reality object (VRO) and two abutting virtual objects (VRO). It should be noted that any number of objects and their individual placements are optional and depends on a current implementation, application and context.

An RWO may be associated with haptic properties. Such haptic properties may be received from a haptic property database once a real world object has been identified. The haptic property data base may be local and stored in the memory of the haptic device or external and stored in another haptic device or in a server. In FIG. 2A the haptic properties of the RWO are shown as vertical lines.

An ARO may also be associated with haptic properties. In FIG. 2A the haptic properties of the AROs are shown as dots.

A VRO may also be associated with haptic properties. In FIG. 2A the haptic properties of the VROs are shown as diagonal lines.

As is illustrated in FIG. 2A, there might be a problem if two (or more) objects having similar haptic properties are presented at locations close to or (at least partially) overlapping one another. For example, the two AROs overlapping the RWO may be difficult to discern or perceive—especially if the haptic presentation device is not a visual device, such as a pair of gloves—as they have similar haptic properties. Likewise, the abutting VROs may be difficult to discern or perceive as they too have similar haptic properties. Keep in mind that the borders, although being clearly visible in FIG. 2A may not be perceivable by haptic output as they may only be visual.

It should be noted that the same applies to any object having similar haptic properties to another object that it is close to or (at least partially) overlapping with.

The inventors have realized this problem and proposes the simple and elegant, yet proactive solution to overcoming such problems, by adapting the haptic properties of one or more objects being proximate another object having similar haptic properties.

An object may be considered proximate another object if they overlap, partially overlap, abut or are within a threshold distance of one another. Such a threshold distance may be based on the object size (for example 5 or 10% of object size), the device size (for example 1, 2, 3, 4 or 5% of device size), a finger size (for example 10, 15, 20, 25 or up to 50% of a (nominal) finger size) or an absolute size (for example 10, 25, 50 or 100 pixels (or voxels; voxels being three dimensional pixels, or 1, 2, 2.5, 3, 4 or 5 mm).

The haptic device 100 is thus configured to receive a haptic model to be presented including objects and their associated haptic properties, determine if any objects are proximate, and if so evaluate their haptic properties, and if they are similar, adapt the haptic properties of one or more of the objects.

The evaluation is, in one embodiment, based on a comparison between the haptic properties of a first object with the haptic properties of a second object. If a property for the first object is within a threshold range (for example +/−5% or less) of the corresponding property of the second object, the evaluation may be determined to indicate that they are similar.

A threshold range may be determined as a difference or as a quota of two properties. A threshold range may be determined as being part of a same section in a list of properties and degrees of said properties.

If both objects are associated with more than one haptic property, the evaluation may be weighted so that a sum of the ratios or differences between a property of the first object and a corresponding property of the second object is less than a threshold value, the evaluation may be determined to indicate that the haptic properties of the first and second objects are similar.

Alternatively or additionally, if both objects are associated with more than one haptic property, the evaluation may be performed so that if all or a portion (for example 75%, 80%, 90% or 95%) of the properties are similar (i.e., within a threshold range of one another), the evaluation may be determined to indicate that the haptic properties of the first and second objects are similar.

In one embodiment, only a subset of haptic properties are compared in the evaluation in order to save processing power.

In one embodiment, only a subset of haptic properties that is common to both(/all) objects being proximate one another are compared in the evaluation.

In one embodiment, the evaluation of similarity is based on a priority of a haptic object. In such an embodiment, the threshold value is based on the priority so that a high priority object is being determined to be similar to another object more easily to ensure that highly prioritized objects are rendered more discernible.

In one embodiment, only haptic properties of a subset of proximate objects, which subset corresponds to that are associated with considered to have a higher discernibility are compared in the evaluation. This enables If it is determined that the haptic properties of two proximate objects are similar, the haptic device is configured to adapt the properties of one or more of the objects.

Figure 2B:
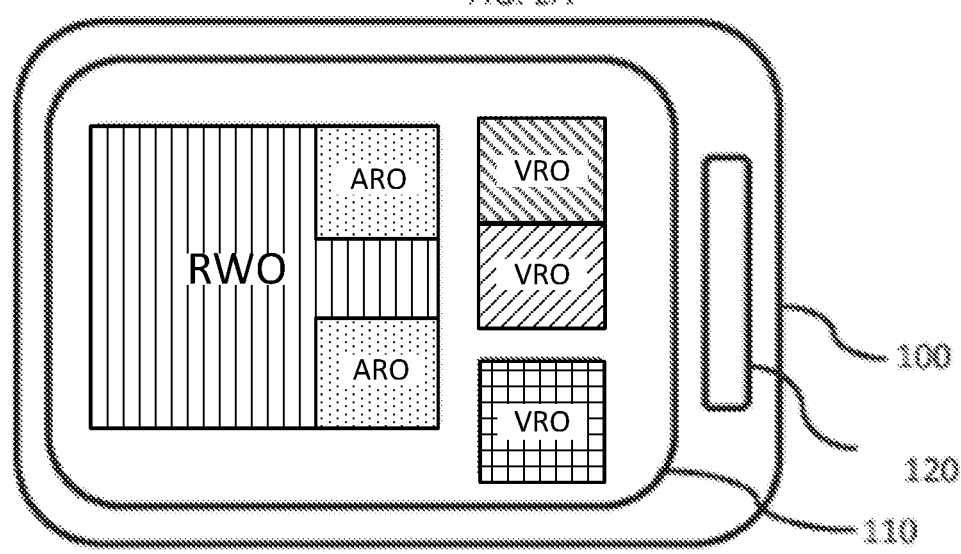
FIG. 2B shows a schematic view of an example haptic device system according to one embodiment of the teachings of this application.

FIG. 2B shows how the haptic properties of the AROs have been adapted so that they are now not similar to the haptic properties of the RWO, as is indicated by the dots indicating the haptic properties of the AROs being sparser. Likewise, the haptic properties of the abutting VROs have been changed as is indicated by the diagonal lines now leaning in opposite ways.

Figure 2C:
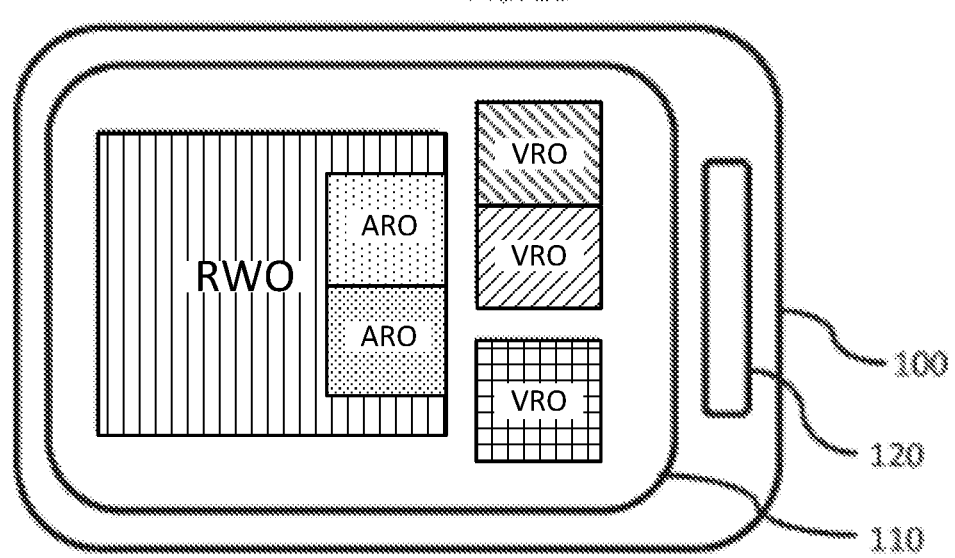
FIG. 2C shows a schematic view of an example haptic device system according to one embodiment of the teachings of this application.

Likewise, if more than one object is proximate other objects, the adaptation may be of more than one object and at different degrees. FIG. 2C shows how the haptic properties of the AROs which are here also proximate one another—have been adapted so that they are now not similar to the haptic properties of the RWO nor one another. This is indicated by the dots indicating the haptic properties of the upper-most ARO being sparser and the dots indicating the haptic properties of the lower ARO being denser.

As the inventors have realized, if two objects have highly similar haptic properties, they may need to be adapted to a larger extent. The haptic device may therefore be configured to evaluate a degree of similarity and adapt the haptic properties accordingly, where a high similarity leads to a high degree of adaptation.

An adaptation of a property may be performed by increasing or decreasing that property. For example, a haptic property being stiffness, the property may be adapted to be more stiff (stiffer), or to be less stiff.

In order to prevent the haptic properties from being adapted to such a degree that they are not recognizable as the objects they are, the haptic device may be configured to only adapt a haptic property up to a maximum allowed degree of adaptation.

In one embodiment, the adaptation is based on an object being proximate or not. In one embodiment, the adaptation is based on how close or proximate and object is to another object. FIG. 3A shows an example where two AROs are determined to not be proximate one another and even though their haptic properties are similar (as is indicated by the same displacement of dots), their haptic properties are not adapted. FIG. 3B shows the situation where the two AROs are closer to one another, and are therefore determined to be somewhat proximate, or proximate to a certain degree, and the haptic properties of one or both of the AROs are adapted according to the degree of proximity, as is indicated by the density of the dots being different. And FIG. 3C shows the situation where the two AROs are very close to one another, and are therefore determined to be proximate, or proximate to a high degree, and the haptic properties of one or both of the AROs are significantly adapted according to the degree of proximity, as is indicated by the density of the dots being highly different.

The haptic device 100 may thus be configured to determine a degree of proximity and adapt the haptic properties of one or more of proximate objects according to the degree of proximity.

As the inventors have also realized, the discernibility of two objects depend on the manner with which they are felt or perceived. As the inventors also have realized, any adaptation is only necessary for objects that are to be perceived.

In order to ensure that objects that are proximate one another and which has similar haptic properties are discernible, the haptic device may be configured to determine a distance to a means for perceiving, such as a finger (F), hand or other body part, and adapt the properties of proximate objects accordingly. This ensures that only if there is a risk of confusing or not being able to discern two objects are they adapted. As an adaptation of an object's haptic properties renders it somewhat skewed or untrue, it would be preferred if as few objects as possible were adapted.

FIG. 4A shows a situation where a finger F is at a first distance to two objects, being proximate one another and having similar haptic properties. As the first distance exceeds a threshold distance (i.e. the two objects can not be touched or felt by the finger) no adaptation is needed and the haptic properties are not adapted.

FIG. 4B shows a situation where a finger F is at a second distance to two objects, being proximate one another and having similar haptic properties. As the second distance does not exceed the threshold distance (i.e. the two objects could be touched or felt by the finger) some adaptation is needed and the haptic properties are adapted accordingly. The threshold distance may be 1, 2, 3, 4 or 5 mm. The degree of adaptation may alternatively or additionally be based on a degree of proximity to the means for perceiving.

The haptic device may be configured to determine that two (or more) objects are proximate, if both(/some/all) objects are proximate and if they are also proximate the means for perceiving. This enables the haptic presentation to remain true for all objects that are not proximate a means for perceiving. For example, if the finger F of FIG. 4B would instead reach in from below, it may only be proximate the lowest ARO and the two AROs need therefore not be adapted, as there is no risk of the means for perceiving actually touching the above ARO.

Figure 5:
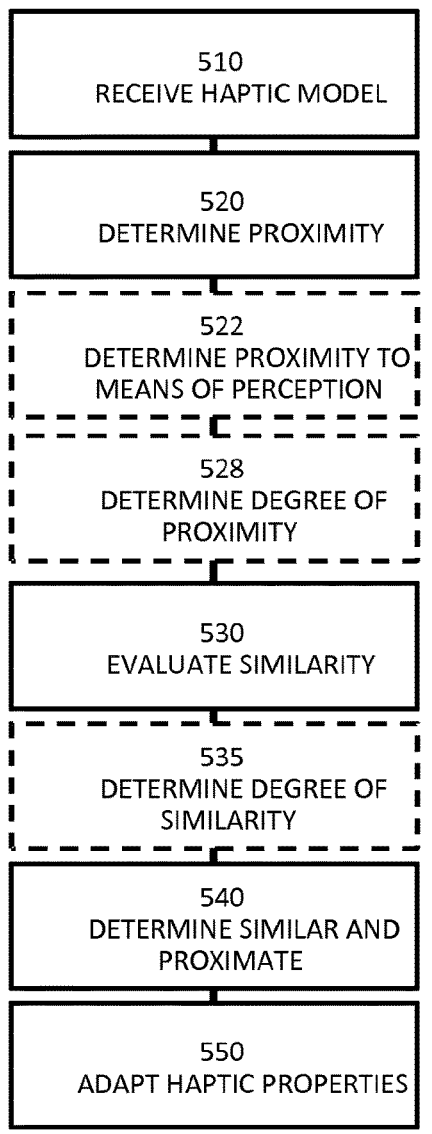
FIG. 5 shows a flowchart for a general method of controlling a haptic device according to the teachings herein.

FIG. 5 shows a flowchart for a general method according to herein for presenting haptic information on a haptic presenter (such as a haptic display) configured to operate according to herein. The flowchart of FIG. 5 is an example embodiment of the more general method and manner addressed in the summary. A haptic device receives 510 a haptic object model comprising one or more haptic objects being associated with haptic properties. The haptic device determines 520 if two or more objects are proximate one another, and if so evaluates 530 the similarities of the haptic properties of the proximate objects to determine 540 that two or more objects are similar and proximate one another. Alternatively, the haptic device evaluates 530 the similarity of objects and determines 520 if any similar objects are proximate one another.

If two or more objects are determined to be similar and proximate one another, the haptic device adapts 550 the haptic properties of one or more of the similar and proximate objects. The similar and proximate objects will thus no longer be both similar and proximate and will thus be discernible from one another.

As has been discussed in the above, the haptic device may determine 522 that an object is proximate only if it is proximate a means for perceiving the object. This is optional as is indicated by the dashed box in FIG. 5.

As has also been discussed in the above, the haptic device may determine 528 a degree of proximity and adapt the haptic properties accordingly. This is optional as is indicated by the dashed box in FIG. 5.

As has also been discussed in the above, the haptic device may determine 535 a degree of similarity and adapt the haptic properties accordingly. This is optional as is indicated by the dashed box in FIG. 5.

Figure 6:
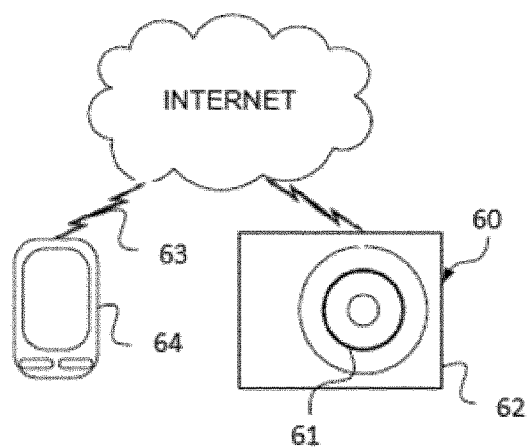
FIG. 6 shows a schematic view of a computer-readable medium according to the teachings herein.

FIG. 6 shows a schematic view of a computer-readable medium as described in the above. The computer-readable medium 60 is in this embodiment a data disc 60. In one embodiment, the data disc 60 is a magnetic data storage disc. The data disc 60 is configured to carry instructions 61 that when loaded into a controller, such as a processor such as the controller 160 of the haptic device 100 of FIGS. 1A and 1B, execute a method or procedure according to the embodiments disclosed above. The data disc 60 is arranged to be connected to or within and read by a reading device 62, for loading the instructions into the controller. One such example of a reading device 62 in combination with one (or several) data disc(s) 60 is a hard drive. It should be noted that the computer-readable medium can also be other mediums such as compact discs, digital video discs, flash memories or other memory technologies commonly used. In such an embodiment, the data disc 60 is one type of a tangible computer-readable medium 60.

The instructions 61 may also be downloaded to a computer data reading device 64, such as the controller 160 or other device capable of reading computer coded data on a computer-readable medium, by comprising the instructions 61 in a computer-readable signal 63 which is transmitted via a wireless (or wired) interface (for example via the Internet) to the computer data reading device 64 for loading the instructions 61 into a controller. In such an embodiment, the computer-readable signal 63 is one type of a non-tangible computer-readable medium 60. The instructions may be stored in a memory (not shown explicitly in FIG. 6, but referenced 160 in FIG. 1B) of the computer data reading device 64.

The instructions comprising the teachings according to the present invention may thus be downloaded or otherwise loaded in to a haptic device 100 in order to cause the haptic device 100 to operate according to the teachings of the present invention.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

In one embodiment, the haptic device is further configured to evaluate the haptic properties of any or all RWOs.

In a scenario where the haptic feedback is performed via an external haptic device (e.g. haptic gloves) and the visualization is performed via an HMD, the logical elements may be placed in the vicinity of background real objects or overlapping such objects.

In an example embodiment, the background is acquired via one or more cameras. The cameras may be RGB, RGB-Depth cameras, or others. Via the RGB image, haptic properties such as texture, stiffness and friction of the object may be obtained. The position and distance between the display device and the background objects may also be obtained from the depth measurements and RGB image.

In an another embodiment, the background objects are identified via the captured camera images, and based on this identification, a haptic model which best approximates said object is requested from a server. As an example, an oak table is identified and the haptic model from an oak table are requested from, e.g. an online server which has stored haptic models from various objects.

In yet another embodiment, the haptic model obtained from the captured images is complemented with haptic model features which are obtained from a server, given the identified real object.

In another example embodiment, images captured from the camera are transmitted to a server which performs the object identification, identification of haptic properties of the objects and creation of the haptic model for said objects.

In one embodiment, the complete haptic model of background real objects is evaluated for each of the haptic model properties, e.g. texture, stiffness and friction. As an example, the amplitude and pattern of said properties is evaluated.

In another embodiment, only a subset of the haptic properties of the real objects is evaluated, according to the haptic properties of the logical object. As an example, if the logical objects only possess a set of haptic properties, it may not be required to evaluate all haptic properties of the real objects haptic model but only the set of haptic properties present in the logical object haptic model. This would save processing power.

In another example, only real objects which are located within a distance of 10, 20, 50, 100, 200, 500 or 1000 mm from the user are evaluated. Such a distance may be defined as the area reachable by the user's arms according to the current user position. In another embodiment, the expected user motion in the environment is considered to define the distance.

An example where the teachings of the present application may come in use is a use case scenario where a user visualizes an object using a head-mounted display (e.g. Microsoft Hololens), while being provided haptic feedback to the object via a haptic device (e.g. GloveOne or Tactai Touch). Various virtual objects with haptic properties are currently being displayed as part of an AR application. Some of these objects are placed within arm's reach of the user. At the same time, the user launches the UI menu. Said menu being issued to change the application, change volume settings, among others. The menu contains logical objects such as buttons and volume sliders.

The haptic model of the virtual objects is evaluated. One of the virtual objects has a stiffness coefficient and texture which is similar to the stiffness and texture of the logical objects of the menu. According to the proposed method, the logical objects stiffness and texture is modified so that the user can easily distinguish the logical object from the virtual object.

A haptic device and a method for controlling such a haptic device, has been disclosed herein. The haptic device comprises a first haptic presentation device (110), and is configured to receive a haptic model comprising one or more haptic objects being associated with haptic properties and determine at least one location property of at least a first and a second of the one or more haptic objects, wherein the location property is related to a location of the corresponding haptic object. As has been disclosed above the location property may be the haptic objects location on the display. It may also be a location in a virtual reality.

The haptic device is also configured to determine a relation between haptic properties of the first and second haptic objects adapt at least one haptic property of one or both of the first and second haptic objects, based on the at least one location property and the determined relation between the haptic properties of the first and second haptic objects. As has been disclosed herein this may be done by evaluating similarities for objects that are proximate one another and adapting the haptic properties of proximate objects so that they can be differentiated from one another. Alternatively or additionally, it may also include evaluating for rotations in a 3D virtual reality so that objects that are not presently proximate one another, but may be after a rotation are changed so that they do not change during a rotation.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for use in a haptic device, comprising a first haptic presentation device, said method comprising:
receiving a haptic model comprising two or more haptic objects being associated with haptic properties;
determining at least one location property of at least a first haptic object and a second haptic object of the two or more haptic objects, wherein the location property is related to a location of the corresponding haptic object by determining if said two or more haptic objects are proximate to one another;
determining a relation between haptic properties of the first and second haptic objects by evaluating similarities of the haptic properties of the first and second haptic objects that are proximate to one another;
determining that the first and second haptic objects are similar and proximate to one another; and
adapting at least one haptic property of one or both of the first and second haptic objects, based on the at least one location property and the determined relation between the haptic properties of the first and second haptic objects by adapting the haptic properties of the first and second haptic objects that are similar and proximate to one another.

2. The method of claim 1, wherein the first haptic object and the second haptic object are determined to be in proximity when the first haptic object and the second haptic object are at least one of overlapped, partially overlapped, abutting and within a threshold distance of one another.

3. The method of claim 2, wherein said threshold distance is based on at least one of size of the first haptic object and the second haptic object, size of the haptic presentation device, and a finger size of a perceived user of the haptic presentation device.

4. The method of claim 1, further comprising determining a degree of proximity of the first and second haptic objects and adapting the haptic properties of the first and second haptic objects accordingly.

5. The method of claim 1, further comprising determining a degree of similarity between the haptic properties of the first and second haptic objects and adapting the haptic properties of the two or more haptic objects accordingly.

6. The method of claim 1, further comprising evaluating a haptic property of a first haptic object by comparing it to a corresponding haptic property of a second haptic object and determine that they are similar if they are within a threshold range of one another.

7. The method of claim 1, wherein only a subset of haptic properties are compared in the evaluation.

8. The method of claim 1, wherein the evaluation of similarity is based on a priority of a haptic object.

9. A non-transitory computer readable storage medium encoded with instructions that, when executed on a processor, perform a method for use in a haptic device, comprising a first haptic presentation device, said method comprising:
receiving a haptic model comprising two or more haptic objects being associated with haptic properties;
determining at least one location property of at least a first haptic object and a second haptic object of the two or more haptic objects, wherein the location property is related to a location of the corresponding haptic object by determining if said two or more haptic objects are proximate to one another;
determining a relation between haptic properties of the first and second haptic objects by evaluating similarities of the haptic properties of the first and second haptic objects that are proximate to one another;
determining that the first and second haptic objects are similar and proximate to one another; and
adapting at least one haptic property of one or both of the first and second haptic objects, based on the at least one location property and the determined relation between the haptic properties of the first and second haptic objects by adapting the haptic properties of the first and second haptic objects that are similar and proximate to one another.

10. A haptic device, comprising a first haptic presentation device, said haptic device being configured to:
receive a haptic model comprising two or more haptic objects being associated with haptic properties;
determine at least one location property of at least a first haptic object and a second haptic object of the two or more haptic objects, wherein the location property is related to a location of the corresponding haptic object by determining that said first and second haptic objects are proximate to one another;
determine a relation between haptic properties of the first and second haptic objects by evaluating similarities of the haptic properties of the first and second haptic objects that are proximate to one another;
determine that the first and second haptic objects are similar and proximate to one another; and
adapt at least one haptic property of one or both of the first and second haptic objects, based on the at least one location property and the determined relation between the haptic properties of the first and second haptic objects by adapting the haptic properties of the first and second haptic objects that are similar and proximate to one another.

* * * * *